June 20, 1950     I. T. WEDIN     2,512,556
BEARING
Filed March 10, 1948
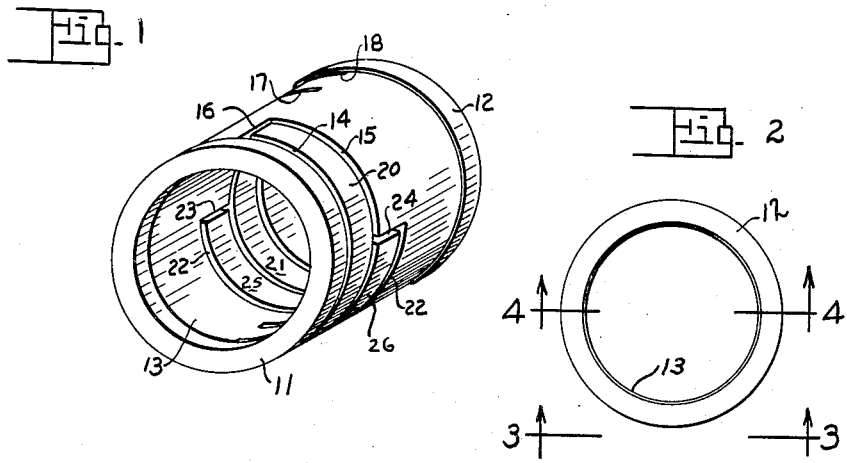
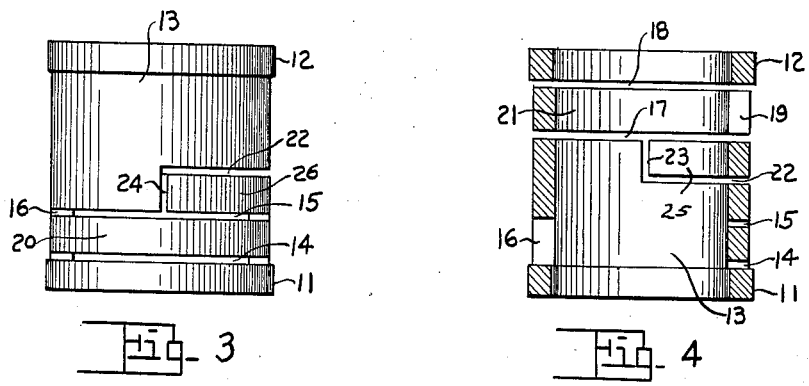
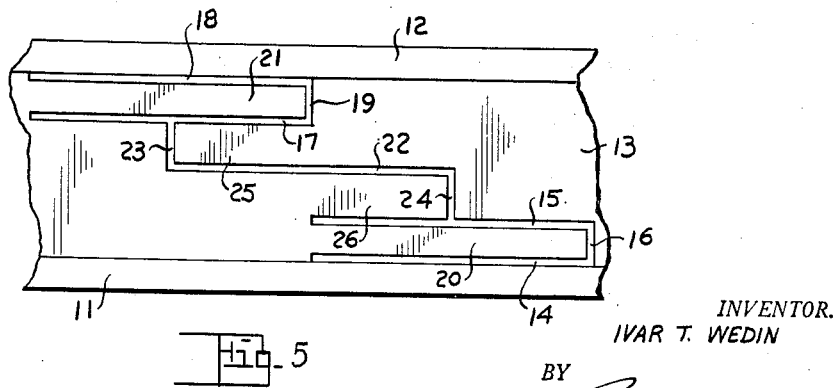
INVENTOR.
IVAR T. WEDIN
BY
Robert A. Sloman
ATTORNEY.

Patented June 20, 1950

2,512,556

UNITED STATES PATENT OFFICE 2,512,556

BEARING

Ivar T. Wedin, Farmington, Mich., assignor of one-half to Gertrude Wedin, Farmington, Mich.

Application March 10, 1948, Serial No. 13,999

8 Claims. (Cl. 308—36)

This invention relates to bearings or bushings and more particularly to a hollow cylindrically shaped bearing which is adapted for automatic expansion transversely of its longitudinal axis.

It is the principal object of this invention to provide a hollow cylindrical bearing having a plurality of spaced transverse slots formed therein to render the same transversely expansible under changing temperature conditions.

It is the further object of this invention to provide in such a bearing a plurality of such transverse slots with their one ends being interconnected by longitudinal slots to provide one or more arcuate sectors which are readily expansible in a direction transversely of the longitudinal axis of said bearing.

It is the further object of this invention to provide in said bearing a plurality of 180 degree slots arranged transversely of its longitudinal axis with their corresponding one ends being interconnected by a longitudinal slot to provide an arcuate sector which is expansible transversely of said longitudinal axis.

It is the still further object of this invention to provide in such bearing a pair of solid end portions of slightly increased internal diameter, and with the central portion of said bearing intermediate said ends being provided with a plurality of transverse arcuate slots whose one ends are joined by a longitudinal slot to provide one or more transversely expandible sectors.

These and other objects will be seen from the following specification and claims in conjunction with the appended drawing in which:

Fig. 1 is a perspective view of the bearing.

Fig. 2 is an end view thereof.

Fig. 3 is an elevational view thereof, on line 3—3 of Fig. 2.

Fig. 4 is an elevational section on line 4—4 of Fig. 2, and

Fig. 5 is a developed plan view of the interior surface of said bearing.

It will be understood that the above drawing illustrates merely a preferable embodiment of the invention, and that other embodiments are contemplated within the scope of the claims hereafter set out.

Referring to the drawing the bearing consists of a hollow cylindrical element constructed of any desired bearing material such as brass, and including the solid circular end portions 11 and 12 and the central bearing portion 13.

The end portions are slightly larger in outer diameter than the outer diameter of central portion 13, while the internal diameter of said end portions is slightly greater than the internal diameter of the central bearing element 13, relatively to which a rotatable object is journaled.

The present invention provides a bearing structure wherein this central bearing element 13 is rendered expansible transversely of the longitudinal axis of the bearing to thereby prevent a freezing condition between the rotatable element journaled therethrough and said bearing under certain heating conditions.

More particularly the central bearing element 13 has formed therein and at one end a pair of 180 degree arcuate slots 14 and 15 with their one ends being interconnected by the short longitudinal slot 16 as shown in Fig. 1.

A second pair of 180 degree arcuate slots 17 and 18 are formed in bearing element 13 adjacent its other end, being arranged upon the opposite side thereof from slots 14 and 15, as shown in Fig. 1. The corresponding one ends of arcuate slots 17 and 18 are interconnected by the longitudinal slot 19 which is shown in Fig. 5.

It will be noted that the short longitudinal slots 16 and 19 are arranged at substantially 180 degrees from each other whereby a pair of 180 degree flexible arcuate sectors 20 and 21 are formed in bearing element 13 with their free ends being spaced substantially 180 degrees from each other.

It will be noted also that the flexible sectors 20 and 21 extend in opposite directions from each other so that the bearing element 13 has a pair of spaced arcuate sectors arranged at opposite sides thereof to provide transversely yieldable surfaces.

While in the present embodiment said sectors are shown to be 180 degrees in length it is contemplated that the purpose of the present invention would be served regardless of the length. Consequently the 180 degree lengths are shown merely as an example as one preferable embodiment of the invention.

The two sectors 20 and 21 are arranged upon opposite sides of the bearing, and a further 180 degree arcuate slot 22 is centrally arranged and formed within bearing element 13, being positioned substantially at right angles to the direction of slots 14, 15, 17 and 18, relative to the exterior surface of bearing element 13.

Short longitudinal slots 23 and 24 extend in opposite directions from the respective ends of slot 22 and respectively join central portions of the arcuate slots 15 and 17, as viewed in Fig. 5.

Consequently it is seen that a pair of oppositely extending 90 degree sectors 25 and 26 are also provided within bearing element 13 whose free ends are bounded by the short longitudinal slots 23 and 24.

It will be noted that the short flexible sectors 25 and 26 extend oppositely from each other so that their free ends are positioned at points intermediate the ends of the long sectors 20 and 21. As shown in Figs. 1 and 5 the short longitudinal slots 16, 19, 23 and 24 are spaced at 90 degrees around the surface of bearing element 13 so that said slots in effect provide a longitudinal split for the bearing element 13, with the respective portions thereof being arranged at 90 degrees from each other around the bearing surface, i. e. in staggered relation.

By the above arrangement of slots within bearing element 13 it is seen that the same is capable of transverse expansion relative to its longitudinal axis, with said expansiveness being substantially and equally distributed throughout the surface of bearing element 13.

It is contemplated that there could be many other arrangements of the aforementioned slots which would in effect provide for a plurality of free ended sectors in said bearing surface with said free ends being distributed in spaced relation around the periphery of said bearing element.

Heretofore various efforts have been made to provide a non-freezing bearing, making the same in a plurality of separate parts, however it is the purpose of the present invention to provide a unitary bearing whose bearing surface is longitudinally split, but with the longitudinal slotted portions which form this split being arranged in spaced relation around said bearing, and in staggered relation.

Furthermore the present construction includes a plurality of transverse splits in said bearing element to provide a plurality of free ended expansible sectors, which terminate in said staggered longitudinal split portions.

In view of the slots 15, 16, 17, 18, 14, 19, 23 and 24, it is clear that bearing element 13 is also susceptible to expansion in a direction coaxial with the longitudinal axis of said bearing.

Having described my invention, reference should now be had to the claims which follow for determining the scope thereof.

I claim:

1. A hollow cylindrical bearing having a plurality of spaced transverse slots formed therein as well as a plurality of spaced interconnected longitudinal slots arranged around the same in staggered relation interconnecting the one ends of adjacent transverse slots to render said bearing readily expansible transversely of its longitudinal axis.

2. A hollow cylindrical bearing having a plurality of spaced transverse slots formed therein, as well as a plurality of 90 degree spaced interconnected longitudinal slots arranged around the same in staggered relation interconnecting the one ends of said transverse slots to render said bearing readily expansible transversely of its longitudinal axis.

3. A hollow cylindrical bearing having a pair of spaced transverse 180 degree slots on one side with a longitudinal slot interconnecting their one ends to provide a 180 degree flexible bearing sector, a pair of oppositely arranged 180 degree slots on its opposite side with a longitudinal slot interconnecting their corresponding opposite ends to provide a second 180 degree flexible bearing sector, and a central 180 degree transverse slot intermediate said first 180 degree slots, with oppositely extending longitudinal slots at its ends interconnecting central portions of the adjacent 180 degree slots to provide a pair of oppositely extending 90 degree sectors, to thereby render said bearing readily expansible transversely of its longitudinal axis.

4. A hollow cylindrical bearing having a plurality of pairs of spaced transverse slots therein arranged around the periphery thereof and with interconnected longitudinal slots arranged around the same in staggered relation interconnecting one of the ends of said pairs of slots to provide a plurality of arcuate free ended sectors in said bearing which are readily expansible transversely of the longitudinal axis of said bearing.

5. A hollow cylindrical bearing having a pair of spaced end portions of slightly increased internal diameter by which said bearing may be immovably supported, and a central transversely flexible bearing portion intermediate said ends, the same being longitudinally split by a plurality of spaced interconnected longitudinal slots arranged around the same, in staggered relation.

6. A hollow cylindrical bearing having a pair of spaced end portions of slightly increased internal diameter by which said bearing may be immovably supported, and a central transversely flexible bearing portion intermediate said ends, the same being longitudinally split by a plurality of spaced longitudinal slots arranged around the same in staggered relation, there being a plurality of spaced transverse slots formed therein interconnecting said longitudinal slots, to thereby provide a plurality of spaced free ended arcuate sectors in said bearing portion.

7. A hollow cylindrical bearing having a plurality of spaced transverse slots formed therein to render the same readily expandable axially as well as transversely of its longitudinal axis said bearing being longitudinally split by a plurality of spaced interconnected longitudinal slots arranged around the same in staggered relation.

8. A hollow cylindrical bearing having a plurality of spaced transverse slots formed therein as well as a plurality of spaced longitudinal slots arranged around said bearing in staggered relation and interconnecting the one ends of adjacent transverse slots providing a plurality of free ended arcuate sectors to render said bearing readily expandable axially as well as transversely of its longitudinal axis.

IVAR T. WEDIN.

REFERENCES CITED

The following references are of record in the file of this patent:

UNITED STATES PATENTS

| Number | Name | Date |
| --- | --- | --- |
| 421,089 | Wood | Feb. 11, 1890 |
| 1,103,107 | Van Dresser | July 14, 1914 |
| 2,349,690 | Arms | May 23, 1944 |
| 2,421,668 | Ware | June 3, 1947 |